Dec. 19, 1961     E. C. ITTNER     3,013,755
INTAKE FOR WATER SUPPLIES
Filed May 16, 1960
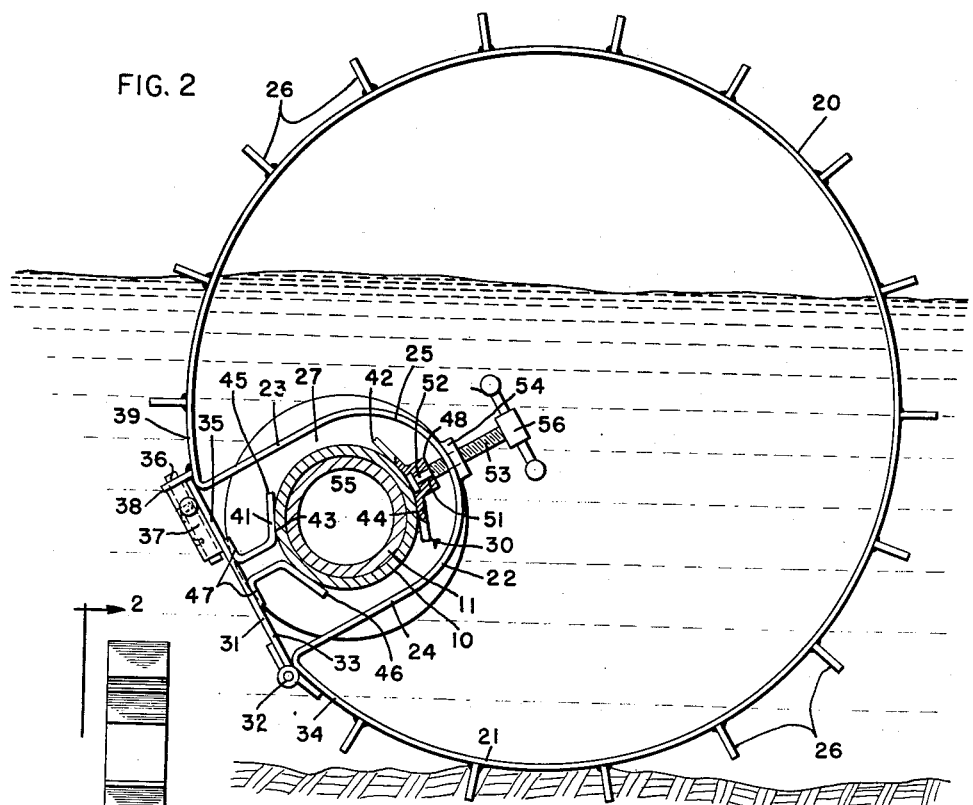
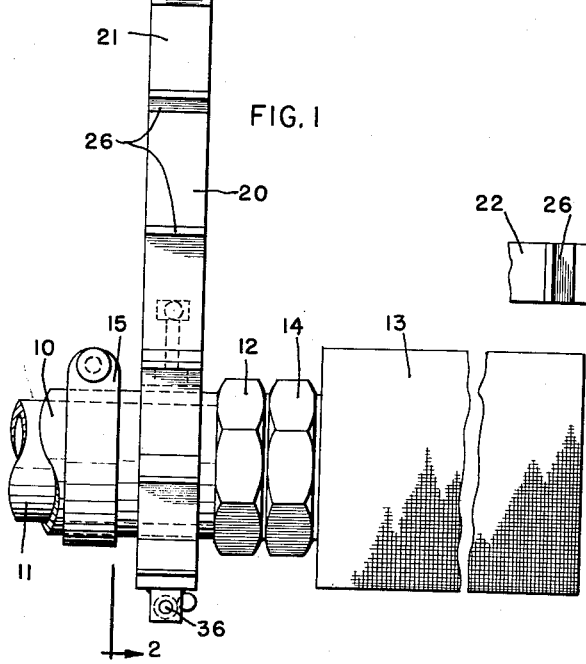
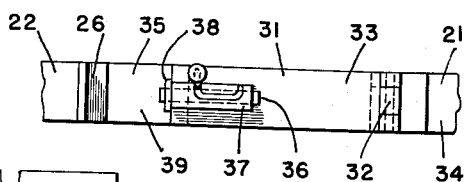
*INVENTOR.*
EDWIN C. ITTNER
BY
*Caswell + Lagaard*
ATTORNEYS United States Patent Office 3,013,755
Patented Dec. 19, 1961

3,013,755
INTAKE FOR WATER SUPPLIES
Edwin C. Ittner, Cass Lake, Minn.
Filed May 16, 1960, Ser. No. 29,335
6 Claims. (Cl. 248—75)

The herein disclosed invention relates to intake devices for water supplies and, particularly, to devices for immersion in an exposed body of water and has for an object to provide a device whereby the intake conduit may be placed at any suitable elevation above the bottom of the body of water.

Fire departments operating in rural and farm districts usually find it difficult to secure water to quench fires and will utilize any local pond or body of water in proximity to the premises. It frequently occurs that such bodies of water have a mud bottom or a bottom covered with partially decomposed vegetation which will quickly clog the intake strainer and prevent the flow of the water when the intake end of the hose is placed on the bottom of the body of water. The instant invention overcomes this disadvantage by providing a construction by means of which the intake may be positioned at any desired height above the bottom, within certain limits, to permit of drawing clear water into the supply hose.

Another object of the invention resides in providing a device which may be inserted into the body of water without the fireman wading in the water to position the device.

Another object of the invention resides in providing a device which may be adjusted for elevation while immersed in the water and from the shore.

A still further object of the invention resides in providing a device in the form of a wheel and to which the intake is situated eccentrically with reference to the axis of the wheel and with the hose running from the intake extending generally transversely of the plane of the wheel.

Another object of the invention resides in providing a clamp for the hose carried by the wheel and in which the hose may be rotated, if desired.

An object of the invention resides in mounting the device on the rim of the wheel.

Other objects of the invention reside in the novel combination and arrangement of parts and in the details of construction hereinafter illustrated and/or described.

In the drawings:

FIG. 1 is a side elevational view of an intake device with the intake of a water supply connected thereto and illustrating an embodiment of the invention.

FIG. 2 is a sectional elevational view of the structure shown in FIG. 1 with the wheel partly rotated and taken on line 2—2 of FIG. 1.

FIG. 3 is a bottom view of a portion of the structure as shown in FIG. 2.

For the purpose of illustrating the invention, the intake of a water system has been shown in the drawings. The intake includes a hose 10 which is connected to a suitable water pump, not shown. This pump may be of the type used by fire departments of suburban communities and, forming no particular feature of the invention, has not been shown. The hose 10 is mounted on a nipple 11 which has a nut 12 at the end of the same. The intake further includes a strainer 13 which is provided with a fitting 14 adapted to be screwed into the nut 12 and by means of which the strainer is attached to the end of the hose. A hose clamp 15 encircles the end of the hose 10 and holds the hose attached to the nipple 11.

The invention proper includes a wheel 20 which has a rim 21 of sufficient diameter to raise the hose the required amount, as will presently become apparent. The rim 21 is constructed from band iron and is formed at one locality with a depressed U-shaped loop 22 extending inwardly from the circumference of the wheel. This loop has legs 23 and 24 extending inwardly from the rim and a connecting portion 25 therebetween, said loop being open at the periphery of the rim. Lugs 26 welded, or otherwise secured to the rim, enter the bottom of the body of water and hold the wheel 20 in position.

Mounted within the confines of the loop 22 is an intake clamp 30, best shown in FIG. 2. This clamp includes a gate 31 which extends across the open end of the loop 22 and closes the same. A hinge 32 welded, or otherwise secured, to one end 33 of said gate and the terminal portion 34 of the rim 21 adjacent the leg 24 of loop 22 supports said gate for swinging movement from a position closing the space 27 within the loop 22 to an open position. The other end 35 of said gate carries a sliding bolt 36 mounted in a case 37 attached to said gate. This bolt is adapted to engage a latch lug 38 welded to the terminal portion 39 of the rim 22 adjacent the leg 23 of loop 22. When the bolt 36 is in the position shown in FIG. 2, the gate 31 is in closing position and is rigidly held in such position.

The intake clamp 30 further includes two co-operating jaws 41 and 42 which have facing V-shaped sockets 43 and 44. The jaw 41 comprises two pieces, 45 and 46, constructed of band iron, bent in the form shown and having bases 47 welded to the gate 31. The jaw 42 comprises a single piece of band iron bent as shown in FIG. 2 and which has a boss 48 welded to the same. This boss is formed with a bore 51 which rotatably receives the reduced end 52 of a screw 53. A washer 55 riveted to the end 52 of screw 53 holds said screw swivelly attached to the jaw 42. Screw 52 is screwed into a nut 54 welded to the connecting portion 25 of the loop 22. The screw 53 may be rotated by means of a handle 56 which is secured to the end of the same.

The method of using the invention is as follows: The wheel 20 is turned until the loop 22 is uppermost. Gate 31 is next disengaged by withdrawing bolt 36 from engagement with latch lug 38 and the gate swung back clear of the space 27 in loop 22. The screw 53 is then turned back sufficiently to provide room for the hose and the hose laid upon the jaw 42. Gate 31 is then swung back to the position shown in FIG. 2 and the bolt 36 latched. Screw 53 is then tightened until the hose is securely clamped in position. The wheel 20 is next pushed into the water by pushing on the hose until the same is the desired distance from the shore. If the strainer is submerged, well and good. If not, the drop necessary for submersion is noted. If the hose has a swivel connection in it, the same is loosened and the section having the intake rotated while the device is in the water until the strainer is below the water level. The swivel is then tightened. Where there is no swivel employed, the device is withdrawn from the water and the clamp 30 loosened. The entire wheel is then rotated until the hose is at about the right elevation. Clamp screw 53 is then tightened and the device pushed back into the water. If desired, the operator may wade out into the water and adjust the portion of the holder when the depth of the water permits it.

The advantages of the invention are manifest. Water otherwise unfit for pumping may be used in quenching a fire. The application of the device to the hose can be quickly made so as to have water available at the earliest possible moment. The device is simple to operate and can be constructed at a nominal expense. The device can be used with existing intakes of water supplies without reconstruction thereof.

Having described the invention, what is claimed as new and desired to be protected by Letters Patent is:

1. An intake device for supporting the intake of a water supply at different heights above the bottom of a body of water comprising a wheel having a rim, an intake clamp carried by said rim and disposed within the confines of said rim and in close proximity thereto, said hose and wheel being relatively rotatable with reference to one another, and means for tightening said clamp to hold the hose and clamp from relative rotation, said means being disposed within the confines of said rim.

2. An intake device for supporting the intake of a water supply at different heights above the bottom of a body of water comprising a wheel having a rim, said rim having a loop extending inwardly thereof and formed with an opening extending through said rim and through which the intake may be inserted into the space within said loop, means for closing said opening and clamping means within said space for holding the intake attached to said wheel.

3. An intake device for supporting the intake of a water supply at different heights above the bottom of a body of water comprising a wheel having a rim, said rim having a loop extending inwardly thereof and formed with an opening extending through said rim and through which the intake may be inserted into the space within said loop, a gate extending across said opening and hingedly connected at one end to said rim at one side of said opening, latch means at the other end of said gate for holding said gate in closed position and hose clamping means carried by said gate.

4. An intake device for supporting the intake of a water supply at different heights above the bottom of a body of water comprising a wheel having a rim, said rim having a loop extending inwardly thereof and formed with an opening extending through said rim and through which the intake may be inserted into the space within said loop, a gate extending across said opening and hingedly connected at one end to said rim at one side of said opening, latch means at the other end of said gate for holding said gate in closed position, a jaw carried by said gate and engaging the intake on one side thereof and a complemental jaw carried by said loop and engaging the intake on the other side thereof.

5. An intake device for supporting the intake of a water supply at different heights above the bottom of a body of water comprising a wheel having a rim, said rim having a loop extending inwardly thereof and formed with an opening extending through said rim and through which the intake may be inserted into the space within said loop, a gate extending across said opening and hingedly connected at one end to said rim at one side of said opening, latch means at the other end of said gate for holding said gate in closed position, a jaw carried by said gate and engaging the intake on one side thereof, a nut carried by said loop, a screw screwed into said nut, and a jaw swivelly mounted on said screw and engaging the intake on the opposite side thereof.

6. An intake device for supporting the intake of a water supply at different heights above the bottom of a body of water comprising a wheel having a rim, a clamp within said rim including a jaw within the confines of said rim, a member extending inwardly from said rim, a nut on said member disposed inwardly of and spaced from said rim and a screw screwed in said nut and confined wholly within the confines of said rim, means on one end of said screw for engaging said intake and urging it against said jaw and means on said screw for turning said screw, said last named means being disposed wholly within and operable from within the confines of said rim.

References Cited in the file of this patent
UNITED STATES PATENTS

| | | |
|---|---|---|
| 428,690 | McKelvey | May 27, 1890 |
| 1,714,329 | Stevens | May 21, 1929 |